United States Patent
Harvey

Patent Number: 6,154,301
Date of Patent: Nov. 28, 2000

[54] FIBER OPTIC RECEIVER

[76] Inventor: Philip C. Harvey, 20 Drinkwater Rd., Hampton Falls, N.H. 03844

[21] Appl. No.: 08/966,964

[22] Filed: Nov. 10, 1997

[51] Int. Cl.[7] .................................................. H04B 10/06
[52] U.S. Cl. ......................... 359/193; 359/194; 359/195; 359/189
[58] Field of Search ................................... 359/193, 194, 359/195, 189, 152

[56] References Cited

U.S. PATENT DOCUMENTS

| 4,644,145 | 2/1987 | Gündner | 250/201 |
| 5,015,839 | 5/1991 | Tanikoshi | 250/214 |
| 5,132,828 | 7/1992 | Conner et al. | 359/173 |
| 5,440,654 | 8/1995 | Lambert, Jr. | 385/17 |
| 5,467,204 | 11/1995 | Hatano et al. | 358/482 |
| 5,572,351 | 11/1996 | Hadjifotiou | 359/161 |
| 5,801,867 | 9/1998 | Geller et al. | 359/189 |

*Primary Examiner*—Jason Chan
*Assistant Examiner*—Mohammad Sedighian

[57] ABSTRACT

The fiber optic receiver disclosed herein is adapted to receive optical signals which are digitally modulated between an "ON" state in which light is being transmitted and an "OFF" or dark state. The analog output signal of a photodetector is thresholded to obtain a binary electrical output signal and is also sampled during the binary state corresponding to the "ON" received signal. A liquid crystal element is energized as a function of the sampled amplitude thereby to establish a feedback loop driving the sampled amplitude toward a preselected level providing predictable skewing of transitions in the binary output signal.

7 Claims, 1 Drawing Sheet

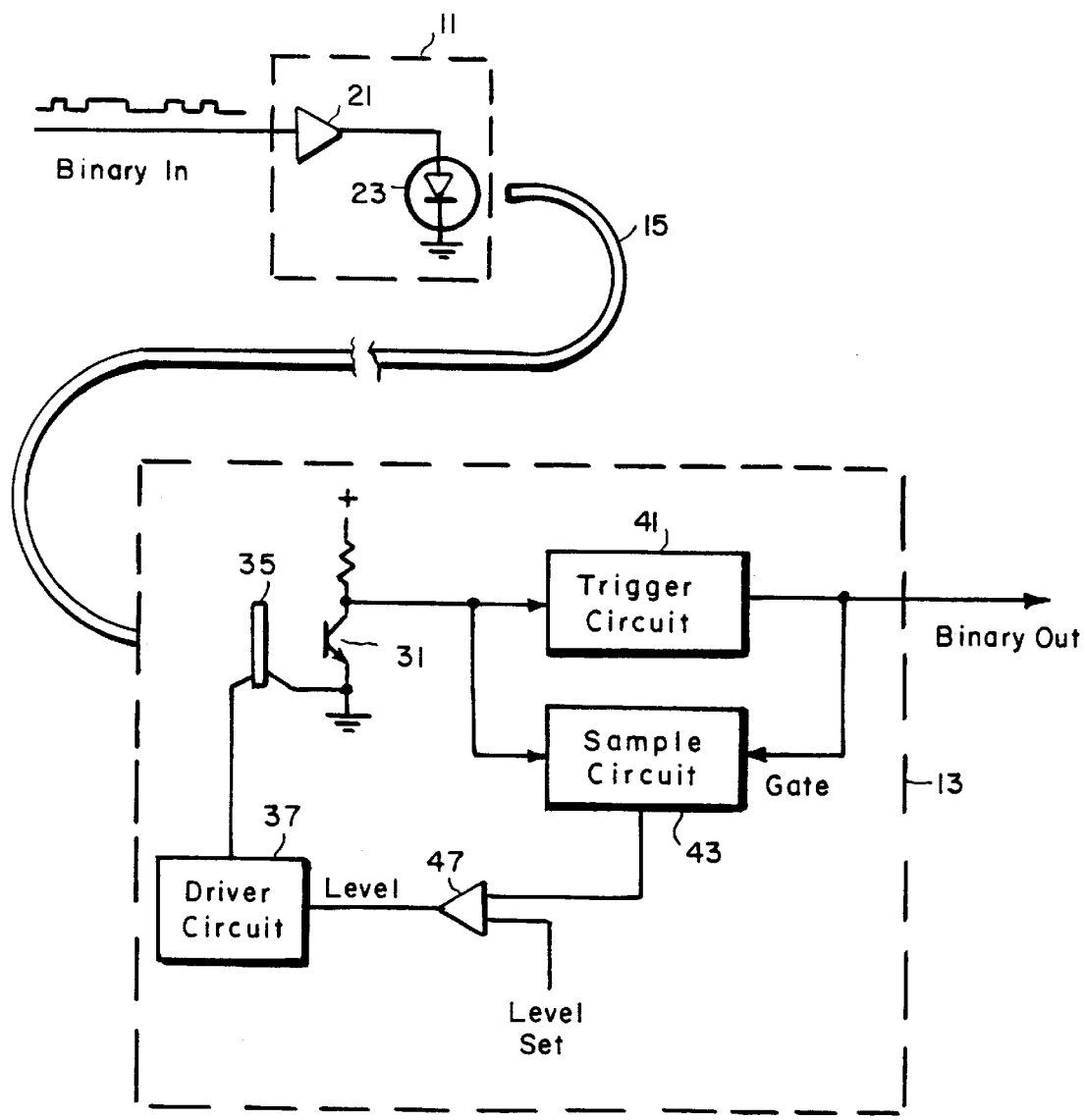

FIBER OPTIC RECEIVER

BACKGROUND OF THE INVENTION

The present invention relates to a fiber optic receiver and more particularly to such a receiver which provides predictable skewing of transitions in a binary output signal derived from the received optical signal.

As is understood by those skilled in the art, the light losses encountered in digital fiber optic transmission links can vary widely in actual practice. Losses in the cables and in the connections between the cables and optical transmitters receivers connected to the cable are subject to a variety of problems including not only the length of the signal path and mechanical changes due to temperature weathering, and the passage of time, but also assembly techniques and the skill of the technicians doing the assembly.

To assure that sufficient signal strength is available in the worst case to activate the receiver, transmitters are typically designed to produce enough signal strength to overcome the expected maximum loss. However, in the nominal case where there are relatively normal or minimal losses, the high power transmitted signal tends to overload the receiver or at least operate it at a power level which is beyond its optimum operating range.

The receiver is typically a photosensor, e.g. photodiode or phototransistor, that converts the received light into an electrical signal. Virtually all such devices are subject to saturation effects. For example, the sudden application of strong light results in a quite rapid transition to the "ON" state while the sudden removal of a strong light results in a relatively slow recovery to the "OFF" state. This effect results in a waveform skew that is strongly dependent on light intensity. The variation of skew with intensity seriously limits the data rate or signal bandwidth of systems designed to accommodate a wide range of signal path variations.

When the waveform skew is known and constant, it can be corrected by the common device of introducing a skew in the other direction and various schemes of implementing such effects are known in the art. However, since many of the causes of optical loss are unpredictable, the skewing is likewise unpredictable and unpredictable or unknown skewing cannot be compensated by the typical prior art schemes.

Among the several objects of the present invention may be noted the provision of a fiber optic receiver for digitally modulated optical signals which provides predictable skewing of transitions in a binary output signal derived from a photodetector responsive to the received optical signal; the provision of such a receiver which facilitates high data rates, hence a broad digital signal bandwidth; the provision of such a receiver which accommodates a substantial range of variation in nominal intensity of the received optical signal; the provision of such a receiver which is highly reliable and which is of simple and relatively inexpensive construction. Other objects and features will be in part apparent and in part pointed out hereinafter.

SUMMARY OF THE INVENTION

The fiber optic receiver of the present invention is adapted to receive optical signals which are digitally modulated between an "ON" state in which light is being transmitted and an "OFF" or dark state. A photodetector provides an analog electrical signal which varies as a function of the light level incident on the photodetector. A trigger circuit interconnected with the photodetector responds to the level of the analog signal for providing a binary output signal switching between a first level and a second level, corresponding to the "ON" and "OFF" optical signal states respectively. The amplitude of the analog signal is also sampled during periods when the binary signal is at the first level. A liquid crystal element of variable transmissivity is interposed in the light path to the photodetector and driver circuitry energizes the liquid crystal element as a function of the sampled amplitude of the analog signal, thereby establishing a feedback loop driving the sampled amplitude towards a preselected level.

BRIEF DESCRIPTION OF THE DRAWING

The sample drawing illustrates a digital fiber optic signal transmission system or link incorporating a fiber optic receiver in accordance with the present invention.

DESCRIPTION OF THE PREFERRED EMBODIMENT

The digital fiber optic signal transmission link illustrated in the drawing is adapted to communicate a digital or a binary signal from an optical transmitter 11 to an optical receiver 13 through the intermediary of a fiber optic cable 15 while providing predictable skewing of transitions in the binary output signal relative to the original input signal. The digital or binary input signal is applied, through a suitable driving amplifier 21, to an optical transmitter, e.g. a light-emitting diode (LED) 23. Light emitted from the diode 23 is coupled through the optical fiber 15 to the receiver 13. Receiver 13 incorporates a photodetector, e.g. a phototransistor 31. The optical signal arriving through the optical fiber 15 is coupled to the phototransistor through a liquid crystal element 35 having variable transmissivity. Beam spreading and focusing optics may be employed as understood by those skilled in the art. The transmissivity of the liquid crystal element 35 is controlled by a driver circuit 37 which responds to a level control input signal. While the electrical drive to the liquid crystal element may be a.c., the variation in transmissivity is relatively slow and does not follow the a.c. waveform as is understood by those skilled in the art.

The analog output signal derived from the phototransistor 31 is applied to a trigger circuit 41 which converts the analog signal to a binary electrical output signal which switches between a first level and a second level in response to the level of the analog signal relative to a predetermined threshold. As is understood, such trigger circuits typically exhibit some hysteresis so that there will in fact be some slight difference between the amplitude thresholds at which the positive-going and negative-going transitions occur.

The analog output signal derived from the photodetector 31 is also applied to a sampling circuit 43. The sampling circuit 43 is gated by the binary output signal from the trigger circuit 41 so as to sample the amplitude of the analog signal during those intervals when light is being received, i.e. the "ON" state. While the sampling could be performed digitally, it is presently preferred and simpler to employ a conventional analog sample-and-hold circuit. The value of the sampled amplitude is employed, relative to a preselected level set amplitude, to control the level signal applied to the LCD driver circuit 37, e.g. by means of a differential amplifier 47. Since the signal being sampled is essentially squarewave in nature, a peak detector could also be used to generate a level fairly representative of the "ON" state level. It will be understood, however, that the average level should not be used (as it is in a.g.c. circuits), since the average level depends on the digital data content.

Since the driver circuit 37 controls the transmissivity of the liquid crystal element 35 and that transmissivity in turn affects the value of the analog signal from photodetector 31 when light is being received, it can be seen that a feedback loop is established. The sample and hold circuit is preferably biased so that any drift in the holding circuit tends to increase the light amplitude in the absence of received "ON" levels. The feedback loop operates, in the presence of optical signals including some "ON" states to drive the sampled amplitude towards a preselected level which can be adjusted by means of the level set signal applied to the differential amplifier 47. By appropriately selecting the nominal "ON" state, saturation effects can be minimized so that predictable skewing of transitions is provided.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A fiber optic receiver for optical signals which are digitally modulated between an "ON" state in which light is being transmitted and an "OFF" dark state, said receiver comprising:

a photodetector providing an analog electrical signal which varies as a function of the light level incident on said photodetector;

interconnected with said photodetector, a trigger circuit responsive to the level of said analog signal for providing a binary electrical output signal switching between a first level and a second level, corresponding to said "ON" and "OFF" states respectively;

means for sampling the amplitude of said analog signal during periods when said binary signal is at said first level;

a liquid crystal element of variable transmissivity interposed in the light path to said photodetector;

driver circuitry for energizing said liquid crystal element as a function of the sampled amplitude of said analog signal.

2. A receiver as set forth in claim 1 wherein said photodetector is a photo-sensitive transistor.

3. A receiver as set forth in claim 1 wherein said sampling means is a sample and hold circuit gated by said binary output signal.

4. A receiver as set forth in claim 1 wherein said driver circuitry is responsive to the difference in level between said sampled amplitude and a preselectable level.

5. A fiber optic receiver for optical signals which are digitally modulated between an "ON" state in which light is being transmitted and an "OFF" or dark state, the light level during said "ON" state being variable, said receiver comprising:

a photodetector providing an analog electrical signal which varies as a function of the light level incident on said photodetector;

interconnected with said photodetector, a trigger circuit responsive to the level of said analog signal relative to at least one predetermined threshold level for providing a binary electrical output signal switching between a first level and a second level, corresponding to said "ON" and "OFF" states respectively;

means for sampling the amplitude of said analog signal during periods when said binary signal is at said first level;

a liquid crystal element of variable transmissivity interposed in the light path to said photodetector;

driver circuitry for energizing said liquid crystal element as a function of the sampled amplitude of said analog signal thereby to establish a feedback loop driving said sampled amplitude toward a preselected level providing predictable skewing of transitions of said binary output signal.

6. A receiver as set forth in claim 5 wherein said sampling means is a sample and hold circuit gated by said binary output signal.

7. A fiber optic receiver for optical signals which are digitally modulated between an "ON" state in which light is being transmitted and an "OFF" or dark state, the light level during said "ON" state being variable, said receiver comprising:

a photodetector providing an analog electrical signal which varies as a function of the light level incident on said photodetector;

interconnected with said photodetector, a trigger circuit responsive to the level of said analog signal relative to at least one predetermined threshold level for providing a binary electrical output signal switching between a first level and a second level, corresponding to said "ON" and "OFF" states respectively;

a sensing circuit gated by said binary output signal for sampling the amplitude of said analog signal during periods when said binary signal is at said first level;

an optical element of variable transmissivity interposed in the light path to said photodetector;

driver circuitry for energizing said optical element as a function of the sampled amplitude of said analog signal thereby to establish a feedback loop driving said sampled amplitude toward a preselected level providing predictable skewing of transitions of said binary output signal.

* * * * *